US012095836B2

(12) United States Patent
Kolaxis

(10) Patent No.: US 12,095,836 B2
(45) Date of Patent: Sep. 17, 2024

(54) COMPUTER-IMPLEMENTED METHOD FOR EMULATING A PHYSICAL, OPEN-OFFICE ENVIRONMENT, UC APPLICATION FOR CARRYING OUT THE METHOD, AND COMMUNICATION FOR REAL-TIME COMMUNICATION AND COLLABORATION

(71) Applicant: Unify Patente GmbH & Co. KG, Munich (DE)

(72) Inventor: Ioannis Kolaxis, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 383 days.

(21) Appl. No.: 17/626,197

(22) PCT Filed: Jul. 25, 2019

(86) PCT No.: PCT/EP2019/070136
§ 371 (c)(1),
(2) Date: Jan. 11, 2022

(87) PCT Pub. No.: WO2021/013364
PCT Pub. Date: Jan. 28, 2021

(65) Prior Publication Data
US 2022/0277267 A1   Sep. 1, 2022

(51) Int. Cl.
*H04L 65/00* (2022.01)
*H04L 65/401* (2022.01)
*H04L 65/403* (2022.01)
*H04M 3/56* (2006.01)

(52) U.S. Cl.
CPC .......... *H04L 65/403* (2013.01); *H04L 65/401* (2022.05); *H04M 3/568* (2013.01)

(58) Field of Classification Search
CPC ..... H04L 65/403; H04L 65/401; H04M 3/568
See application file for complete search history.

(56) References Cited

U.S. PATENT DOCUMENTS

| 7,769,705 B1 | 8/2010 | Luechtefeld |
| 2017/0099296 A1 | 4/2017 | Fisher |
| 2022/0159125 A1* | 5/2022 | Malan ................... H04M 3/568 |

OTHER PUBLICATIONS

International Search Report for PCT/EP2019/070136 dated Nov. 8, 2019.
Written Opinion of the International Searching Authority for PCT/EP2019/070136 dated Nov. 8, 2019.

* cited by examiner

*Primary Examiner* — Rasha S Al Aubaidi
(74) *Attorney, Agent, or Firm* — Buchanan Ingersoll & Rooney PC

(57) ABSTRACT

A computer-implemented method can include providing a list of team members, each of the team members being grouped according to the team they are working with. The method can also include establishing a virtual floor plan comprising the location of every team in a virtual office, wherein the location of every team on the virtual floor plan corresponds to the arrangement of the teams in a real physical office building; determining the distance between the teams on the virtual floor plan according to the distance between the teams in the real physical office building; detecting conversations of the respective teams; and outputting the conversations of the respective teams so an output device located at the least one remotely working team member is able to output the conversations. A system and a device can be provided to utilize the method as well.

17 Claims, 3 Drawing Sheets

| Conversations in progress ... | Jump into conversation | Toggle Mute |
|---|---|---|
| A (Team 1), B (Team 1) | 🕺 | 🔊 Front-Right |
| C (Team 1), D (Team 1), H (Team 2) | 🕺 | 🔇 Muted |
| F (Team 2), L (Team N) | 🕺 | 🔊 Front-Left |
| G (Team 2), M (Team N) | 🕺 | 🔊 Rear-Right |
| I (Team 2), K (Team N) | 🕺 | 🔊 Rear-Left |

COMPUTER-IMPLEMENTED METHOD FOR EMULATING A PHYSICAL, OPEN-OFFICE ENVIRONMENT, UC APPLICATION FOR CARRYING OUT THE METHOD, AND COMMUNICATION FOR REAL-TIME COMMUNICATION AND COLLABORATION

CROSS-REFERENCE TO RELATED APPLICATIONS

The present application is the U.S. national stage of International Patent Application No. PCT/EP2019/070136, which was filed on Jul. 25, 2019.

FIELD

The present invention relates to a computer-implemented method for emulating a physical, open-office environment, a Unified Communication (UC) application for carrying out the computer-implemented method that can be stored on a non-transitory computer readable medium, and a communication system for real-time communication and collaboration.

BACKGROUND

Home office working has become very popular during the last number of years. However, although more and more organizations and companies are allowing their employees to work remotely, a trend to the opposite direction becomes apparent recently, by employers calling remote employees back to the office.

For example, in the year of 2013, Yahoo abolished its work-at-home policy, ordering everyone to work in the office. As stated by Yahoo, the reason for this decision was that face-to-face interaction among employees fosters a more collaborative culture and stimulates innovation. According to studies, people who work from home are significantly more productive, but less innovative.

In 2017, IBM took a similar decision, calling thousands of remote employees back to the office. As stated by IBM, this decision will help IBM to have the innovation and pace of the best small tech companies. According to studies, the value of innovation (achieved by employees working together, in a physical office) is so strong that it outweighs any productivity gains (achieved by remote employees). Particularly, companies like Apple and Facebook make around $2,000,000 per employee, whereas IBM makes only $200,000 per employee. IBM needs more than better productivity, with the company's strategy being to reinvent itself around new businesses like AI, and Cloud.

Also, a Harvard study revealed that researchers who worked in close physical proximity produced more impactful papers, having a significantly higher number of citations compared to other papers.

SUMMARY

Thus, generally, on the basis of the above mentioned studies, which have revealed that in a physical office, it was determined that employees have more chance encounters and unplanned interaction and it is assumed that this unplanned, accidental communication promotes collaboration, and stimulates innovation in an organization.

On the other hand, working at a home office or remotely from the company's office, brings about some advantages, too. Namely, the employee working at home, for example, saves the time that he or she would normally spend going back and forth to work; and also the employer has an advantage in saving office space and thus, money, since with a several percentage of the employees working at home, less office space has to be provided so that much money may be saved on office rent.

Therefore, solutions for reconciling both objects, namely, allowing remote work for employees, but at the same time maintaining their working efficiency and creativity have been sought. However, in prior art, only solutions are provided for enhancing the working environment, e.g., during planned meetings or workshops, making use of specialized hardware.

However, there exists no solution for unifying the two objects mentioned above for the everyday working practice, when team members perform their daily task with at least some of the team members not being located in the same office or office building since they work remotely. Thus, there exists a problem in prior art in enhancing collaboration products and real-time communication and collaboration platforms for remote communication and collaboration between for example, working teams so as to maintain the working efficiency, and in particular, to promote unplanned interaction between remote employees, foster a more collaborative culture, and thus stimulate innovation.

A method, a UC application, and a system can be provided which can allow for at least one member of the team to work remotely without having a negative impact on work efficiency and creativity of the remotely working team member(s).

A computer-implemented method for emulating a physical, open-office environment in which a plurality of teams are working is provided, wherein each team has a plurality of team members, wherein at least one team member of a first team is working remotely, and wherein the at least one remotely working team member is connected to the other team members and to other teams by using a Unified Communications (UC) application for collaborating and communicating with the other team members and the other teams. The method can include the steps of: providing a list of team members, wherein the team members are grouped according to the team they are working with; establishing a virtual floor plan comprising the location of every team in a virtual office, wherein the location of every team on the virtual floor plan corresponds to the arrangement of the teams in a real physical office building; determining the distance between the teams on the virtual floor plan according to the distance between the teams in the real physical office building; detecting the conversations of the respective teams; and outputting the conversations of the respective teams via an output device located at the least one remotely working team member, wherein the volume of the conversations of the respective teams is adapted according to the distance between the teams so as to provide a working atmosphere according to the real physical office building.

Thus, a real office environment and atmosphere can be reproduced so that a remotely working employee, located, for example, at his or her home office, will feel as if he or she is working in a real physical office with the other team members and may communicate and collaborate with his or her team members and other teams in a way as if he or she was working in the real physical office. By providing the real-life open-office working atmosphere, the remotely working employee's creativity will be promoted and his or her work will be more efficient.

Moreover, by emulating the physical office, all the team members stay "connected" all the time, therefore promoting unplanned, accidental communication which, as outlined above, supports the creativity and thus, efficiency of the employees.

It is noted that the term "emulating" or "emulation" is to be understood in a broader sense, namely, basically in the sense of recreating or reproducing the real office atmosphere for a remotely working person.

According to a preferred embodiment of the invention, the step of determining the distance between teams comprises a step of assigning a Distance Between Teams (DBT) value to the distances determined.

According to another preferred embodiment, the DBT value is determined on the basis of the collaboration between the teams, wherein teams that collaborate often, in particular, a predetermined number of times within a predetermined time period, are located adjacent to each other, and wherein the distance between adjacent teams corresponds to a DBT value of 1.

According to still another preferred embodiment, the less a team collaborates with another team, the further is the distance between the teams and the higher is the DBT value. For example, the DBT value for a distance of a first team can be a first value for a first team having a first level of collaboration with a third team and the DBT value for a second team can be a second value for the second team having a second level of collaboration with the third team. The second value for the DBT value for the second team can be larger than the first value for the DBT value for the first team based on the first level of collaboration with the third team being higher for the first team as compared to the second team.

Preferably, the UC provides a Graphical User Interface GUI for setting the DBT value.

Also, it is advantageous, if the DBT value is automatically configured.

If a conversation is detected, the method may comprise a further step of outputting a visual indication on a screen of the UC application indicating that there is an ongoing conversation.

Preferably, the visual indication is output for team members of the team, in which the conversation takes place, and for teams that on the virtual floor plan are adjacent to the team, in which the conversation takes place.

According to another preferred embodiment, the method provides an option for a user to participate in the active conversation, in particular, by providing a button or an icon on the screen which allows a user to jump into the active conversation, when the button or icon is activated.

Further, according to another preferred embodiment, the method provides an option for a user to continue his or her conversation with another team member or a team member of another team in private so that other team members may not hear them.

Also, if a conversation is detected, the UC application may automatically adjust the sound volume of the conversation detected for each team member who is listening depending on the distance of the team of that team member to a team member, in particular, to the closest team member of the team in which the conversation takes place.

According to yet another preferred embodiment, the sound volume is decreased the further a team member who is listening is located away from the team in which the conversation takes place.

It is advantageous that the step of outputting the conversations of the respective teams further comprises distributing the sound detected to different output devices, wherein the sound detected for a first active conversation is output at a first output device and the sound detected for a second active conversation is output at a second output device.

The UC application may preferably further provide an interface for muting or unmuting a conversation. While a conversation is muted, it is not allowed/possible for a team member to jump into this conversation.

Moreover, a UC application is provided, which is adapted to carry out the computer-implemented method for emulating a physical, open-office environment as specified above. The UC application can be stored on a non-transitory computer readable medium of a server so that a processor of the server can run the application. The server can be a computer device that is configured to perform the method defined by the UC application when the processor of the server runs the application.

Further, a communication system for real time communication and collaboration is provided, which comprises a server and a plurality of clients, wherein the server is adapted to run the UC application as specified above. The server can be a computer device that is communicatively connected to the clients or be communicatively connectable to the clients in the system. Each of the clients can be associated with a different team member and be a communication terminal (e.g. smart phone, laptop computer, personal computer, tablet, etc.). Each client can utilize the UC application that may be hosted by the server.

According to a preferred embodiment, each client comprises at least one output device, in particular, a sound system.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

FIG. 4 shows the visual indication of ongoing conversations shown in FIG. 2 according to another embodiment.

Figure 1:
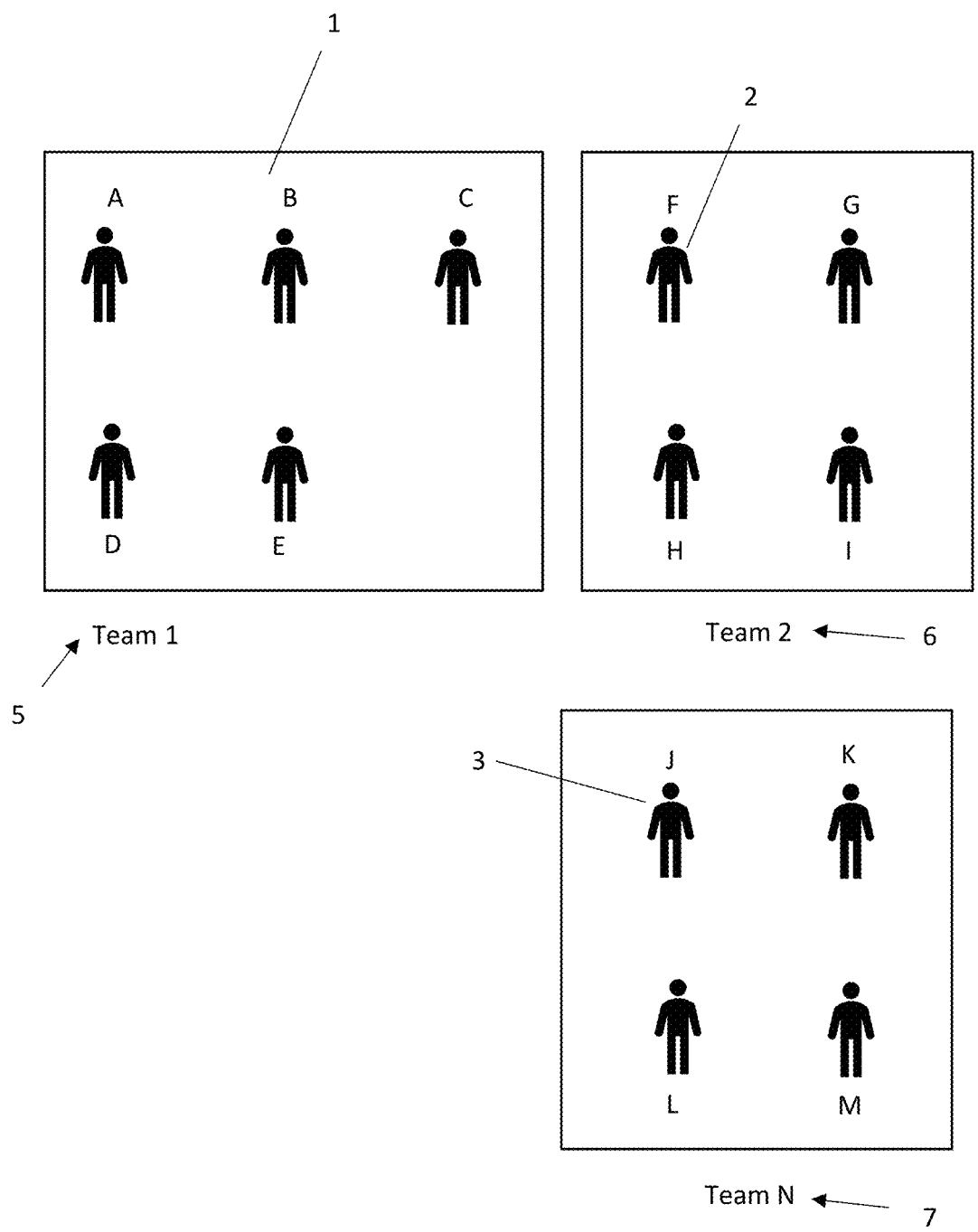
FIG. 1 shows a schematic illustration of team members grouped into different teams according to an embodiment of the invention.

Reference numerals used in the drawings include:
1 team member
2 team member
3 team member
5 first team
6 second team
7 third team
8 visual indication
9 screen
10 button with jump into conversation icon
11 visual indication
12 privacy button
13 mute button
14 visual indication

DETAILED DESCRIPTION

FIG. 1 shows a schematic illustration of team members 1, 2, 3 that are grouped into several different teams, namely, here a first team 5, a second team 6, and a third team 7 for the following exemplary scenario. A company is organized in a distributed form, which means that all employees of the company are working remotely, for example, at respective home offices. It could, however, just as well be assumed that a company has a physical office building with several work places for employees and some employees are working in the office building, while other employees are working remotely, for example, at home.

Here, in the scenario illustrated in FIG. 1, the remote employees are considered to be team members 1, 2, 3, etc. and every team member belongs to a specific team. For example, team member 1 indicated by reference numeral 1 belongs to the first team 5, which consists of five team members, namely, A, B, C, D, and E. Team member G, indicated by reference numeral 2, belongs to the second team 6, which consists of four team members, namely, G, F, H, and I. Team member K, indicated by reference numeral 3, belongs to the third team 7, which consists of four team members, namely, K, J, L, and M.

All employees or team members A, B, C, D, E, F, G, H, I, J, K, L, M commonly use a Unified Communications (UC) application to communicate and collaborate, for example, by exchanging text messages, calling each other, and having video conferences via the clients associated with those employees. Each client can be a laptop computer, personal computer, smart phone, tablet, or other type of communication terminal, for example. The UC application can be a service hosted by a server that is connectable to the clients. The server can include a processor connected to non-transitory memory that has the UC application stored thereon so that the processor of the server can run the UC application. The server can be communicatively connected to the clients via at least one communication network connection to host the UC application services for the communication and collaboration of the employees.

According to an embodiment, the emulation of a physical, open-office environment in which a plurality of teams are working (in the example shown in FIG. 1, three teams), is realized in the following manner. In order to create a virtual office which would actually correspond to a real office especially with respect to how the single team members and teams are seated or located in the office, a list of employees is created that comprises all employees as team members working for a given team. As mentioned above, this would for example be employees A, B, C, D, E working in the first team 5, or "Team 1".

Then, the Distance Between Teams (DBT) is determined, which is the distance of a given team to other teams. The DBT is represented by a value which provides an indication of how the teams would be positioned in a real physical office. Teams that need to work together on a daily basis to get their job done are usually positioned right next to each other in an open office layout. For example, the first team 5, or "Team 1" collaborates closely with the second team 6, or "Team 2", that is why in an open office layout they would be neighboring or adjacent teams, situated right next to each other, thus, a value of DBT=1 is assigned to these two teams, representing a close distance or in other terms, meaning that these are adjacent teams. On the contrary, teams that only collaborate occasionally with the first team 5 or "Team 1" would be positioned in a higher distance from the first team 5 or "Team 1", therefore having a higher value of DBT. For example, the first team 5 or "Team 1" occasionally collaborates with the third team 7 or "Team 3", that is why their distance will be higher, for example, in this case it will be set to DBT=2. Teams that are not expected to collaborate (perhaps due to their roles) would be physically located on different floors, which means that their DBT would be too high. For simplicity, it is suggested that the administrator of the UC application will not have to configure and set the distance between teams that are not expected to collaborate, but only the distance between collaborating teams, therefore implicitly specifying how close their collaboration is.

Alternatively, the UC application may provide a Graphical User Interface (GUI) to the administrator, allowing her/him to place teams 5, 6, 7 on a virtual floorplan (not shown), therefore providing a clear, visual indication of how the teams 5, 6, 7 would be positioned in a real physical office. Depending on the distance between the teams 5, 6, 7 on the floorplan, the values of the DBT will be automatically configured for every "Team" entity in the UC application.

In a physical office, when two colleagues or two team members are discussing, the rest of the colleagues or team members or even team members from other adjacent teams that are in the same room are usually able to hear and listen to their conversation. Similarly, the UC application will be adapted so as to enable conversations between two or more employees being able to be heard from their neighboring colleagues or team members. When two team members have a conversation, for example from the first team 5, "Team 1", the team member A calls the team member B, then all the other colleagues from their team (the first team 5 or "Team 1"—namely, members C, D, E), and from "neighboring" teams (for instance from the second team 6 or "Team 2", which has DBT=1, members F, G, H, I) will receive a visual indication on the screen of the UC application that there is a conversation in progress between "team member A (Team 1) and team member B (Team 1)", and automatically listen to this conversation, without any action required from their side. The sound volume of the conversation will be automatically adjusted by the UC application for each listener depending on her/his team's distance from the nearest team member that is actively involved in the conversation. For example, for team member C (from the first team 5 or "Team 1") the sound volume will be the maximum one (since both team members A and B come from her/his team, having a value of zero for the DBT (DBT=0), whereas for the team member F (from the second team 6 or "Team 2") the sound volume of conversation will be automatically decreased, e.g. by 50% (since both team members A and B come from the first team 5 or "Team 1", which has value of DBT=1 with respect to the adjacent second team 6 or "Team 2"). By this sound adjustment according to the distance which team members or teams would have in a real office, a real working atmosphere may be generated and transmitted to a remotely working team member or, in this case, every single team member is working remotely and is provided with the respective conversation sound. Thus, every employee has the feeling as if he or she would be working in a real office and is able to follow all conversations or discussions that he or she could be interested in since he or she is a member of the same team or a team that is co-working with his or her team. It should be understood that is DBT valuation configuration is illustrative of an example. Other values for other situations can be utilized in other embodiments.

Figure 2:
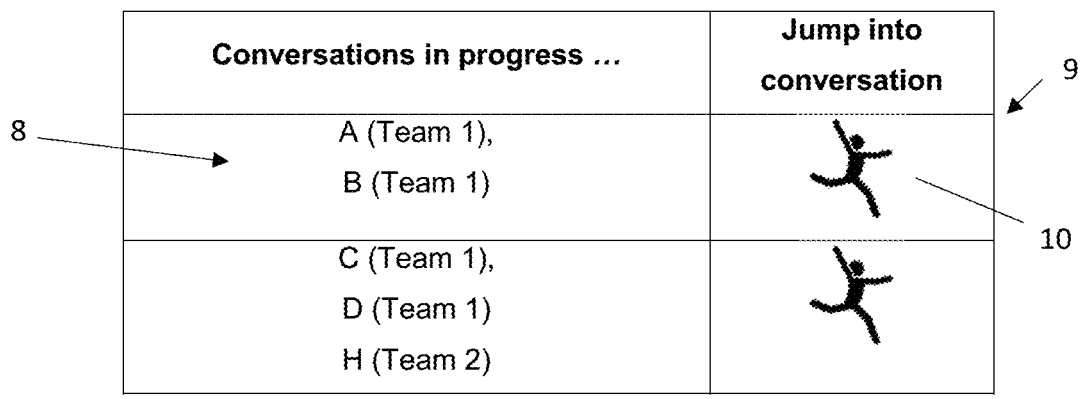
FIG. 2 shows a visual indication of ongoing conversations presented on a screen of a display device according to an embodiment of the invention.

FIG. 2 shows a visual indication 8 of ongoing conversations presented on a screen 9 of a display device (not shown). The visual indication 8 consists of a list presenting the ongoing conversations and indicating the team members participating in the ongoing conversations. If a team member listening to an ongoing conversation wants to contribute to an active conversation, then she/he is provided with the possibility to jump into the conversation by clicking onto a button 10 on the screen 9 which is indicated here as a jumping icon which is displayed right next to every conversation in progress, as presented on the list of the visual indication 8.

Figure 3:
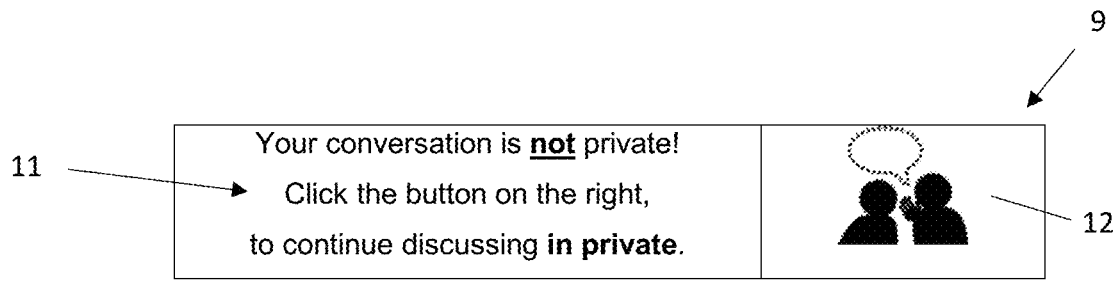
FIG. 3 shows another visual indication according to an embodiment of the invention.

FIG. 3 shows another visual indication 11 presented on the screen 9 to a team member or user of the UC application. Here, the team members A and B belonging to the first team 5, "Team 1", who initiated the current call will have this visual indication 11 displayed on the screen 9 of the UC application, informing them that their conversation is not private, but is being overheard from the "neighboring" team members, for example, by the team members C, D, E of their own team, or from team members F, G, H, I from the neighboring team, namely, the second team 6 or "Team 2". Since it is not always appreciated that a conversation is public at least to a number of people, an option is provided to the team members (in this case, to team members A and B who are having an active conversation) to continue their discussion in private, where they cannot be heard by anyone else, by clicking onto a button 12 provided on the screen 9 which is indicated by the "whisper to ear icon".

FIG. 4 shows the visual indication 8 of ongoing conversations shown in FIG. 2 according to another embodiment. Here, a team member or employee, for example team member 1 of the first team 5 has more than one speaker installed at his or her home office as an output device, functioning as a surround system, with each conversation (streamed by the UC application) being transmitted to a different speaker (please note: also all team members or individual other team members may be provided with such an output device comprising a plurality of speakers and thus with the further functionality described below).

For example, conversations coming from the same team (with a value of DBT=0) may be output and heard by the respective team member or employee from the front speakers, whereas conversations from the neighboring teams may be heard from the rear speakers. Given the number of speakers installed in a home office, for example four speakers (Front-Right, Front-Left, Rear-Right, Rear-Left), this would imply that only a maximum of 4 active conversations may be heard by a team member at any time. In this example, if there are more than 4 active conversations, they would still be displayed by the UC application, but only up to 4 conversations may be audible at any given time. For this reason, each team member will be able to mute (or unmute) an active conversation so that she/he does not listen (or listens) to that conversation, for example, by clicking on the button 13 indicated by a loudspeaker icon. While a given conversation is muted, the team member will not be able to jump into the conversation; for this reason, the jump icon 10 will be disabled, being displayed as grayed out. Additionally, a further visual indication 14 may be provided by the UC application regarding the speaker that is being used to listen to a given conversation.

Further, it is noted that in order to promote collaboration between teams, an organization with physical offices may move a team member to another location to work with a different team. Alternatively, a whole team may be moved to another location to collaborate with a neighboring team. Similarly, in a distributed organization the UC application will allow to move one team member to another team or move a whole team closer to another team within the virtually created office, simply by appropriately configuring the value of the DBT. Additionally, the administrator of the UC application may choose to enable an optional feature, which will be periodically moving a team to neighbor with other, random teams for a given time. For example, "Team N" may be moved to be right next to "Team 1" for 2 weeks; after this period, "Team N" will be moved to be adjacent to "Team 3" for the next 2 weeks. By leveraging this feature, an organization may break down the silos that may exist between teams, allowing the teams to come closer, and potentially collaborate, by identifying synergies that would not be discovered otherwise.

Especially for an organization that has both, employees working in a physical office (on organization premises), and employees working remotely (at their home offices), the UC application hosted by the server will be continuously collecting the ambient sounds from every team member working in the physical office, composing them into a single audio stream, and broadcasting these sounds (including any conversations between employees in the physical office) to the remote team members according to the procedure outlined above. This way, the remote team members can be still "connected" to their team (as well as collaborating neighboring teams), keeping in touch with all day-to-day challenges being faced by their colleagues in the physical office. As described previously, the sound volume of conversations coming from neighboring teams will be automatically decreased, e.g. by 50%, and may optionally be directed by the UC application to the rear speakers in a surround audio system (if such a system is installed).

It should be appreciated that different embodiments of the method, communication system, and a communication apparatus can be developed to meet different sets of design criteria. For example, the particular type of network connection, server configuration or client configuration for a device for use in embodiments of the method or system can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, a network, a server, a communication system, and methods of making and using the same have been shown and described above, it is to be distinctly understood that the invention is not limited thereto but may be otherwise variously embodied and practiced within the scope of the following claims.

The invention claimed is:

1. A computer-implemented method for emulating a physical, open-office environment in which a plurality of teams are working, each team having a plurality of team members, wherein at least one team member of a first team is working remotely, and wherein the at least one remotely working team member is connected to the other team members and to other teams by using a Unified Communications (UC) application for collaborating and communicating with the other team members and the other teams, the method comprising:

provifing a list of team members, wherein the team members are grouped according to the team they are working with;

establishing a virtual floor plan comprising a location of every team in a virtual office, wherein the location of every team on the virtual floor plan corresponds to an arrangement of the teams in a real physical office building;

determining a distance between the teams on the virtual floor plan according to a distance between the teams in the real physical office building;

detecting conversations of the teams; and outputting the conversations of the teams such that the conversations is outputtable at an output device located at the at least one remotely working team member, wherein a volume of the conversations of the teams outputted via the output device is adapted according to the distance between the teams to provide a working atmosphere according to the real physical office building.

2. The method of claim 1, wherein the determining of the distance between teams comprises assigning a Distance Between Teams (DBT) value.

3. The method of claim 2, wherein the DBT value is determined on a basis of collaboration between the teams, wherein teams that collaborate at least a predetermined number of times within a predetermined time period are located adjacent to each other, and wherein the distance between adjacent teams corresponds to a DBT value of 1.

4. The method of claim 3, wherein the DBT value is determined such that the DBT value is higher for the distance between teams that collaborate less than the at least the predetermined number of times within the predetermined time period as compared to the DBT value for the distance between teams that collaborate the at least the predetermined number of times within the predetermined time period.

5. The method of claim 2, wherein the UC application defines a Graphical User Interface GUI for setting the DBT value.

6. The method of claim 2, wherein the DBT value is automatically configured.

7. The method of claim 1, comprising:

in response to detection of a conversation, outputting a visual indication on a screen of a device of at least one of the team members indicating that there is an ongoing conversation.

8. The method of claim 7, wherein the visual indication is output for team members of the team in which the conversation takes place and for team members of the teams on the virtual floor plan that are adjacent to the team in which the conversation takes place.

9. The method of claim 1, comprising:

in response to detection of a conversation, automatically adjusting a sound volume of the conversation detected for each team member who is listening depending on the distance of the team of that team member to a closest team member of the team in which the conversation takes place.

10. The method of claim 9, wherein the sound volume is adjusted so that a volume is decreased based on the distance such that a team member who is listening that is located a first distance from the team in which the conversation takes place has a first sound volume and another team member who is listening that is located a second distance from the team in which the conversation takes place that is greater than the first distance has a second sound volume that is lower than the first sound volume.

11. The method of claim 1, wherein the outputting of the conversations of the teams comprises distributing sound detected to different output devices, wherein a sound detected for a first active conversation is output at a first speaker and a sound detected for a second active conversation is output at a second speaker.

12. The method of claim 1, wherein the UC application defines an interface for muting or unmuting a conversation.

13. The method of claim 1, wherein the UC application is hosted by a UC hosting device that is adapted to carry out the method of claim 1.

14. The method of claim 1, wherein the outputting of the conversations of the teams such that the conversations is outputtable at the output device located at the at least one remotely working team member is performed so that the volume of the conversations of the teams outputted via the output device is adapted according to the distance between the teams to emulate a working atmosphere of the real physical office building.

15. A communication system for real time communication and collaboration, comprising:

a server having a processor connected to a non-transitory computer readable medium, the server being communicatively connectable to a plurality of clients, the non-transitory computer readable medium having an application stored thereon such that the server performs a method defined by the application when the processor runs the application, the method comprising:

providing a list of team members for a plurality of teams, each of the team members being grouped according to a team they are associated with;

establishing a virtual floor plan comprising a location of every team in a virtual office, wherein the location of every team on the virtual floor plan corresponds to an arrangement of the teams in a real physical office building;

determining a distance between the teams on the virtual floor plan according to a distance between the teams in the real physical office building;

detecting conversations of the teams; and outputting the conversations of the teams such that the conversations are outputtable via at least one output device located at at least one remotely working team member of the teams, wherein a volume of the conversations of the teams outputted via the output device is adapted according to the distance between the teams to provide a working atmosphere according to the real physical office building.

16. The communication system of claim 15, wherein each of the clients is associated with a respective one of the team members, each of the clients comprising at least one output device that includes a sound system.

17. The communication system of claim 15, wherein the volume of the conversations of the teams outputted via the output device is adapted according to the distance between the teams to emulate a working atmosphere at the real physical office building.

* * * * *